United States Patent [19]

Brokaw et al.

[11] 4,360,129

[45] Nov. 23, 1982

[54] SYSTEM FOR DISPENSING VISCOUS OR CHUNKY MATERIALS

[75] Inventors: Paul E. Brokaw, Cleveland; Frans L. Adeboi, Berea; Bryan A. Feimer, Broadview Heights; James G. Freeman, East Cleveland; Raymond P. Kawolics, Solon; Frank C. Stanbrook, Brecksville, all of Ohio

[73] Assignee: The Meyer Dairy Products Company, Cleveland, Ohio

[21] Appl. No.: 205,330

[22] Filed: Nov. 10, 1980

[51] Int. Cl.³ ............................................ B67D 5/62
[52] U.S. Cl. ............................. 222/146 H; 222/148; 222/152; 222/195; 222/190; 366/139; 99/472
[58] Field of Search ............ 222/190, 146 H, 146 HS, 222/146 HE, 146 R, 148, 152, 195; 366/139; 99/348, 472, 483

[56] References Cited

U.S. PATENT DOCUMENTS

| | | | |
|---|---|---|---|
| 1,613,787 | 1/1927 | Burke | 366/139 X |
| 1,982,325 | 11/1934 | Shepherd | 222/152 X |
| 2,101,480 | 12/1937 | Smith | 366/139 X |
| 3,969,314 | 7/1976 | Grigull | 366/139 X |
| 4,168,913 | 9/1979 | Kono | 366/139 X |

FOREIGN PATENT DOCUMENTS 946324  4/1974  Canada ................................ 222/152

Primary Examiner—Allen N. Knowles
Attorney, Agent, or Firm—Fay & Sharpe

[57]  ABSTRACT

A system for dispensing flowable foodstuffs such as chili and the like. The system comprises a food-containing reservoir which is at least partially surrounded by a container filled with warm water or the like in order that the foodstuffs be kept in a warm and servable condition. The food reservoir is fitted with a valve generally of the plug or portion control type so that individual servings may be drawn from the reservoir. The dispenser is also fitted with a vacuum source such that a vacuum may be drawn at the upper levels of the food reservoir. An air inlet is provided into the reservoir preferably through the valve itself so that as the vacuum is being drawn on the reservoir, the valve simultaneously will be cleaned by the air flowing through it even when the valve is in its closed position. This air flow, in turn, agitates the flowable or chunky material so that it remains relatively homogenous and so that the chunky or suspended particles in the foodstuff do not settle to the bottom of the reservoir.

9 Claims, 6 Drawing Figures

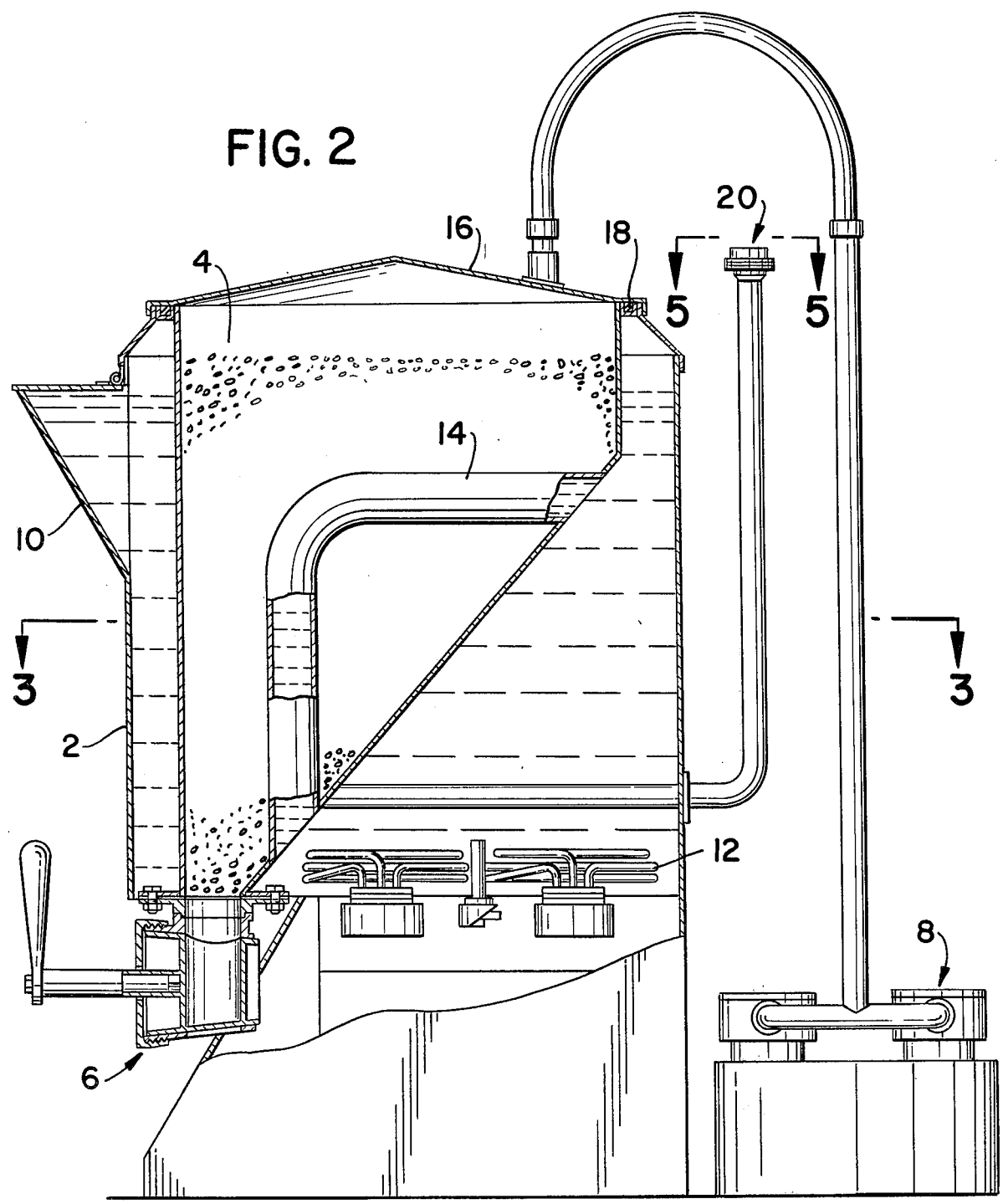

FIG. 3
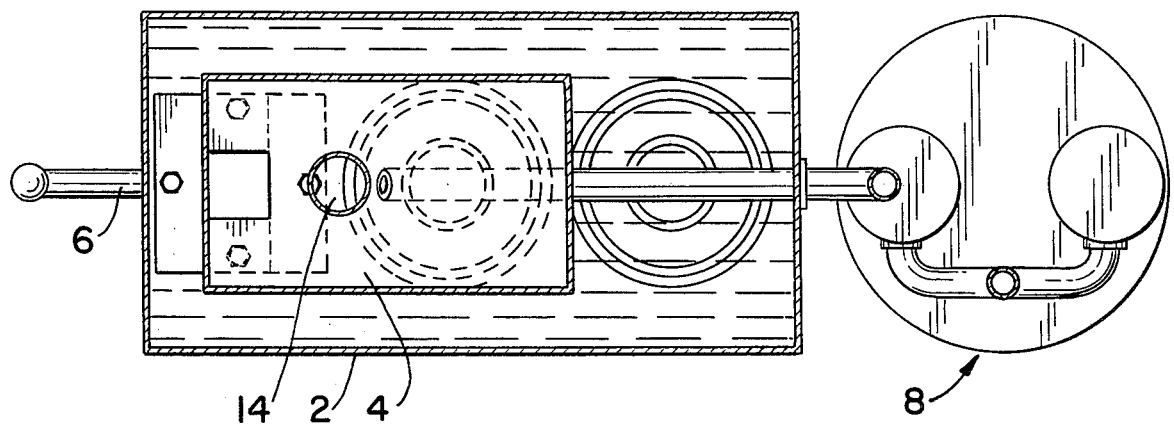
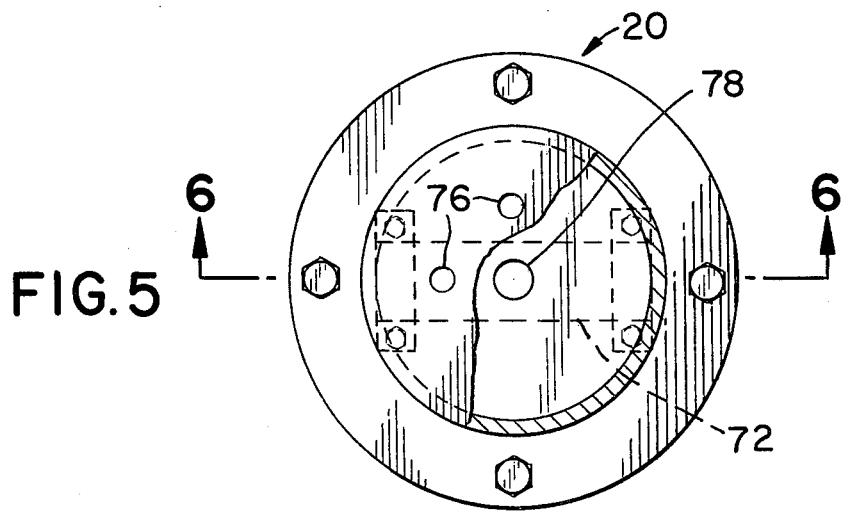
FIG. 5
FIG. 6
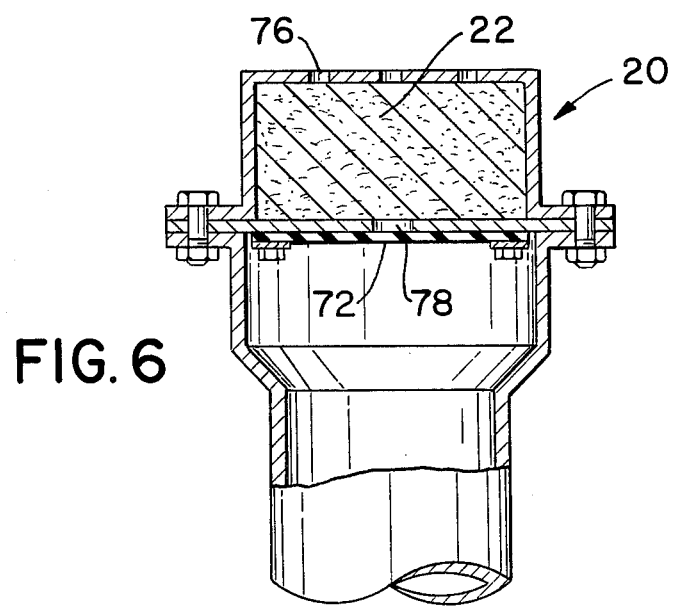

SYSTEM FOR DISPENSING VISCOUS OR CHUNKY MATERIALS

BACKGROUND OF THE INVENTION

This invention pertains to the art of food dispensing systems and apparatus.

The invention is particularly applicable to systems or apparatus for dispensing chunky foodstuffs such as chili, stews or the like, and will be described with a particular reference thereto. However, the invention is capable of broad application and is readily adaptable to other fields, uses and applications.

Food dispensing systems having portion control valves are well known in the prior art. The systems generally comprise a container holding the foodstuff and a valve means through which the food may be dispensed. Typically, the valve is of the plug type and many systems have been adapted so as to provide a predetermined quantity of food for the user each time the valve is operated. In some applications, attempts have been made to provide an agitation, either mechanical or otherwise, to the foodstuff that is to be dispensed in order that the foodstuff may remain generally homogenous and well mixed. It has been found, however, that mechanical agitation is, in some instances, undesirable since it unnecessarily breaks up the chunky portions of the foodstuff and thus, over time, creates a less desirable product.

Also, in the past, compressed air has been introduced into the food-containing reservoirs in a similar attempt to obtain agitation and maintain a more homogenous suspension. In this latter instance it was, of course, possible that contaminants would be introduced into the foodstuff through the pump or motor supplying the pressurization. Alternatively, when compressed gases were used, it was necessary to periodically change the compressed air cylinders thereby making operation of the entire system unnecessarily time consuming and potentially dangerous. Such systems also required the use of special tools to maintain the equipment. In particular, though, in prior food dispensing apparatus designed especially for dispensing extremely viscous foodstuffs, very little attention was paid to continuously and automatically maintaining the valve or outlet in a clean and unclogged condition. Thus, it was often necessary, especially in purely gravity flow applications, to periodically remove and clean the valving mechanism.

The present invention contemplates a new and improved system which overcomes the above-referenced problems and others and provides a dispensing system which is uncomplicated, economical, easy to clean and which maintains flowable foodstuffs in a more or less homogenous and well mixed condition. The invention is designed to dispense material, which is uniform in quality and consistency, at a substantially consistent flow rate. The system and apparatus is readily adapted to use with flowable liquids containing chunky particles and for use in dispensing viscous materials in general.

BRIEF DESCRIPTION OF THE INVENTION

In accordance with the present invention, a reservoir is provided for holding chunky flowable foodstuffs such as chili or the like. The reservoir is provided with a top lid which is adapted for vacuum sealing engagement with the reservoir. Surrounding the reservoir is a jacket or housing designed to contain heated water for warming the contents of the reservoir or for maintaining those contents in a heated condition. A heat source is provided and this source may be adjusted so that the desired temperature is attained and maintained inside the food reservoir.

In one embodiment of the invention, a food heating conduit communicates with the interior of the food reservoir and a flow of heated water is maintained through the conduit by convection. The bottom of the reservoir is in communication and is fitted with a readily detachable dispensing valve which may be of the plug type and preferably is adapted for dispensing controlled portions of the foodstuffs contained in the reservoir.

It is of particular importance in this invention that a vacuum source be provided so that a negative pressure can be maintained in the reservoir. It is contemplated that this vacuum may be varied in intensity according to the desires of the dispenser operator.

It is contemplated, with respect to one embodiment of the instant invention, that the aforementioned vacuum may be drawn to produce a backward air flow through the dispensing valve even when the valve is in its closed position. Thus, the valve will always be kept clean and will not become clogged with the material that is being dispensed. It is possible, of course, to provide a separate filtered air inlet so that air is selectively admitted into the reservoir at some point other than the valved reservoir outlet. This type of a filtered valve arrangement might be required by some local health codes and thus the invention is adaptable to this type of application.

In any event, it is an object of the present invention to provide for gentle agitation of the material in the reservoir through the application of a vacuum to the reservoir in which the foodstuff is contained. It is yet another object of the invention to secure the reservoir lid by application of a vacuum to the inside of the reservoir thus eliminating the need for cumbersome latches, tie-downs and the like.

A still further object of the invention is to provide a system which prevents settling out of suspended particles contained in flowable foodstuffs. The invention also provides a fairly constant and continuous outlet flow rate while simultaneously mixing the food.

Additionally, a readily detachable discharge outlet is provided.

Further objects of the invention will be apparent to those skilled in the art upon a reading and understanding of the following specification.

BRIEF DESCRIPTION OF THE DRAWINGS

FIG. 2 is a side, partial cross-sectional view of the invention;

FIG. 3 is a cross-sectional view taken along line 3—3 of FIG. 2;

FIG. 5 is an enlarged view of an air inlet valve which may be used with one embodiment of the invention and is taken along line 5—5 of FIG. 2;

FIG. 6 is a view taken along line 6—6 of FIG. 5.

DETAILED DESCRIPTION OF THE PREFERRED AND ALTERNATIVE EMBODIMENTS

Figure 1:
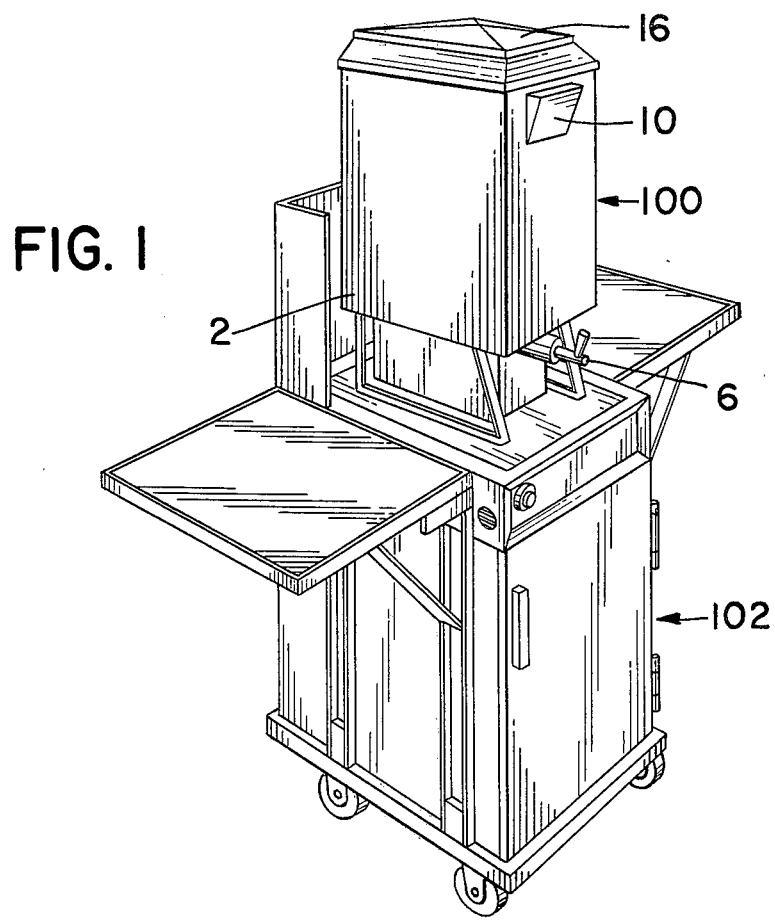
FIG. 1 is a perspective view of the dispenser mounted on a cart.

The drawings are for the purpose of illustrating the preferred and alternative embodiments of the invention and are not for the purpose of limiting the scope of the invention. FIG. 1 shows a dispenser 100 mounted on a cart 102. FIG. 2 shows a cross-sectional side elevational view of the preferred embodiment of the invention which is comprised of outer housing or jacket 2, food reservoir 4, dispensing valve and outlet 6 and vacuum source 8.

It will be appreciated that when the system is in use, liquid, generally water, is poured into fill spout 10 such that the food reservoir 4 is at least partially surrounded.

A heat source 12 is provided for heating the water poured into housing 2. Conduit 14 runs through the food reservoir, thus providing for more rapid heating of the contents of the reservoir. Heated water flows through conduit 14 by convection so that a constant and readily achievable temperature may be obtained within the reservoir.

The food which is to be dispensed, which for purposes of illustration is a liquid suspension such as chili, is introduced either pre-warmed or cold into the top of the reservoir after lid 16 has been removed. It can be seen that lid 16 overlies a gasket 18 in such a manner that a good seal is achieved when a vacuum is drawn on the reservoir. The vacuum may be varied at the option of the operator of the apparatus.

In one embodiment of the invention, the discharge valve and outlet 6 is so designed that when the valve is in its closed condition, as it is illustrated in FIG. 2, it is still possible to draw air into the reservoir. Because of the manufacturing tolerances of some valves, air leakage is inherent when the valve is subjected to a vacuum. Some valves are specifically designed with an air passage to permit air flow while impeding liquid flow. In any event, when air is drawn through the valve or the outlet area, any chunky material that may have been lodged in or around the valve will be sucked up into the reservoir itself, thus maintaining the valve is an unclogged condition. It can aso be appreciated that as air is drawn through the dispensing valve, a gentle agitation of the material within the reservoir occurs. This agitation maintains the material in a fairly homogenous condition and prevents the chunky portions of the chili, such as the beans and chunks of meat, from sinking to the bottom.

It should be parenthetically noted that in some applications it may be desirable to provide an air valve 20 which permits admission of outside air into the reservoir through a filter 22. The provision of such a filtered valving system might be necessary to comply with local health codes. The type of valve that might be employed is illustrated in FIGS. 5 and 6 in which flexible flapper 72 selectively allows an air flow through ports 76 and 78 respectively.

It will be appreciated by those skilled in the art that by agitating the chili or foodstuff by use of a vacuum as opposed to pressurizing the system with a pump, air entering the reservoir is not pumped through a motor or the like and thus applicant's system is substantially more sanitary than a pressurized system. The vacuum system also admits of a continuous and controllable flow rate out of the dispensing valve.

The contents of the reservoir are dispensed substantially gravitationally through the discharge valve but, it is sometimes desirable to provide either a variable venting arrangement on the vacuum line or to provide means in the vacuum system itself so that the amount of vacuum pulled can be regulated, thereby minimizing fluctuations in the flow rate. It may also be desirable to provide a variable venting arrangement on the discharge valve or outlet so that the flow of air through it, or through the separate valve mechanism which may be employed, can also be regulated. Regardless, however, of the method used for regulating the air flow through the system, it will be seen that chunky foodstuffs such as soups and chili will undergo a constant but gentle agitation so that the beans, other vegetables, meat, etc. which are to be dispensed from the reservoir are kept from settling to the bottom. It will also be seen that by allowing a slight air leakage through the valve itself, any food that may become clogged in the valve is soon dislodged. It will also be appreciated that by keeping a slight vacuum on the reservoir any dripping from the valve when it is shut off is eliminated.

It is also readily apparent in the instant system that the need for a locking lid has been eliminated since the vacuum holds the lid on automatically. Also, due to the adjustable nature of the vacuum that is being drawn on the system, various mixing or agitation rates can be attained.

Figure 4:
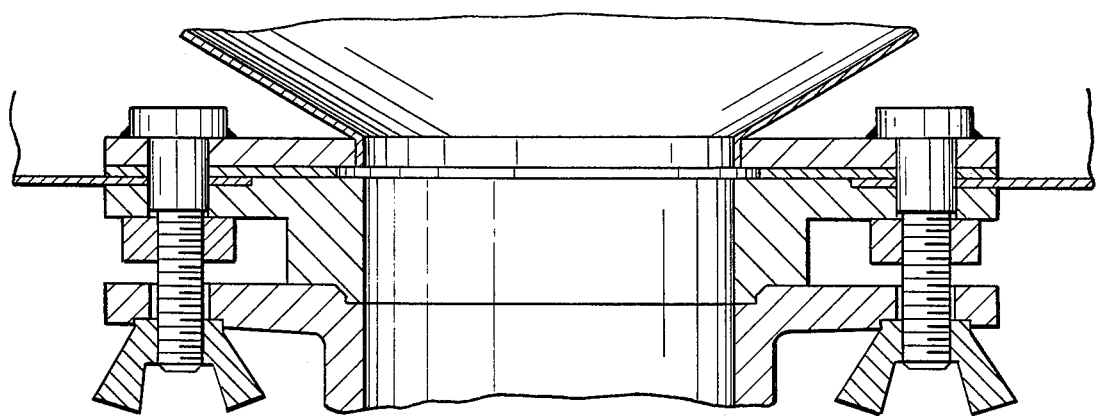
FIG. 4 is a partial front view of the dispensing valve attaching mechanism of one embodiment of the invention.

Of course, food dispensing systems must be periodically manually cleaned. To readily accommodate such cleaning, the discharge valve should be attached so that it is easily removable. One attaching method of accomplishing easy removal is illustrated in FIG. 4. Various other methods will be apparent to those skilled in the art.

The invention has thus been described with reference to the preferred and alternative embodiments. Obviously, modifications are possible without departing from the spirit of the invention and it is intended that all such modifications will be included insofar as they come within the scope of the appended claims or their equivalents.

We claim:

1. Apparatus for heating, mixing and dispensing flowable material in the form of liquid suspensions or the like comprising: a reservoir having a normally open top closed by a lid movable between open and closed positions; a dispensing valve adjacent the bottom of said reservoir for gravitationally dispensing material therefrom; vacuum means for drawing a vacuum in said reservoir and communicating with the interior of said reservoir adjacent the top thereof; air bleed means communicating with said reservoir adjacent the bottom thereof for bleeding air into said reservoir when said vacuum means is operating; a jacket at least partially surrounding said reservoir in spaced relationship thereto for receiving a heat transfer liquid which is sealed against communication with the interior of said reservoir; heating means for heating said heat transfer liquid to impart heat to said reservoir and material therein; whereby, operation of said vacuum means with said lid in closed position subjects said reservoir to a vacuum and causes air to bubble up through material therein from said air bleed means to continuously mix such material while said heating means operates to maintain such material hot, and said valve being operable to gravitationally dispense material from said reservoir while said vacuum means is operating to bubble air up through such material.

2. The apparatus as defined in claim 1 wherein said air bleed means is defined by said dispensing valve through which reverse airflow takes place in its closed position.

3. The apparatus as defined in claim 1 including a conduit extending through said reservoir and being in communication with said heat transfer liquid.

4. The apparatus as defined in claim 1 wherein both said reservoir and said tank are closed by said lid and said lid is releasably held in said closed position by atmospheric pressure acting on the upper side thereof while said reservoir is under a vacuum.

5. The apparatus as defined in claim 1 wherein said vacuum means communicates with the interior of said reservoir through said lid.

6. The apparatus of claim 1 wherein said vacuum means is adjustable for varying the degree of vacuum to which the interior of said reservoir is subjected so that sufficient air flow upwardly through material in said reservoir from said air bleed means is maintained to achieve thorough mixing of the material while enabling rapid gravitational dispensing of the material through said dispensing valve.

7. Apparatus for mixing and dispensing a flowable material comprising: a reservoir having an open top closeable by a lid movable between open and closed positions; a dispensing valve adjacent the bottom of said reservoir and being movable from a closed position to an open position for gravitationally dispensing material therefrom; vacuum means for drawing a vacuum in said reservoir when said lid is closed and being in communication with the interior of said reservoir adjacent the top thereof; and said valve providing reverse airflow therethrough in said closed position thereof when said reservoir is under a vacuum during operation of said vacuum means so that air enters said reservoir through said valve to maintain said valve free of clogging as by packing of settled material therein and the air bubbles up through the material in the reservoir to mix same between intermittent movement of said valve to its open position to dispense portions of material from said reservoir.

8. The apparatus as defined in claim 7 wherein said vacuum means communicates with the interior of said reservoir through said lid.

9. A method of dispensing and mixing a flowable material comprising the steps of: providing a substantially sealable reservoir of flowable material having adjacent the bottom thereof a dispensing valve movable between open and closed positions and providing reverse air leakage therethrough in its closed position; establishing a vacuum in said reservoir in its substantially sealed condition to create reverse airflow into said reservoir through said valve in its closed position and thereby maintain said valve substantially clear of clogging as by packing of settled material therein; causing the air flowing through said valve to bubble up through the material in said reservoir to mix said material; intermittently moving said valve to its open position to dispense material from said reservoir; and continuously maintaining said reservoir under said vacuum all the while said valve is open or closed.

* * * * *